(12) United States Patent (10) Patent No.: US 9,407,683 B2
Kawakami (45) Date of Patent: *Aug. 2, 2016

(54) INFORMATION PROCESSING DEVICE, TABLE, DISPLAY CONTROL METHOD, PROGRAM, PORTABLE TERMINAL, AND INFORMATION PROCESSING SYSTEM

(71) Applicant: Sony Corporation, Tokyo (JP)

(72) Inventor: Daisuke Kawakami, Kanagawa (JP)

(73) Assignee: Sony Corporation (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/304,159

(22) Filed: Jun. 13, 2014

(65) Prior Publication Data

US 2014/0298189 A1 Oct. 2, 2014

Related U.S. Application Data

(63) Continuation of application No. 13/289,193, filed on Nov. 4, 2011, now Pat. No. 8,839,137.

(30) Foreign Application Priority Data

Nov. 11, 2010 (JP) ................................ P2010-252748

(51) Int. Cl.
  G06F 15/00 (2006.01)
  G06F 13/00 (2006.01)
  H04L 29/08 (2006.01)
  G06F 1/16 (2006.01)
  (Continued)

(52) U.S. Cl.
  CPC ............ *H04L 67/025* (2013.01); *G06F 1/1694* (2013.01); *G06F 3/017* (2013.01); *G06F 3/0227* (2013.01); *G06F 3/0484* (2013.01);
  (Continued)

(58) Field of Classification Search
  CPC ...... H04L 67/025; G06F 1/1694; G06F 3/017
  USPC ................. 715/776, 799, 748, 769, 810, 708, 715/762–765
  See application file for complete search history.

(56) References Cited

U.S. PATENT DOCUMENTS 8,332,771 B2* 12/2012 Inaba ............................ 715/769
2006/0279548 A1* 12/2006 Geaghan ....................... 345/173
2013/0179506 A1* 7/2013 Hungerford .................. 709/204

FOREIGN PATENT DOCUMENTS

CN 101876881 A 11/2010
JP 2005316403 A 11/2005

(Continued)

OTHER PUBLICATIONS

Chinese Office Action for CN Application No. 201110345348.0, dated Jul. 10, 2015.

*Primary Examiner* — Kevin Nguyen
(74) *Attorney, Agent, or Firm* — Lerner, David, Littenberg, Krumholz & Mentlik, LLP

(57) ABSTRACT

An information processing device includes a touch panel that detects a first user input, a communication unit that communicates with a portable terminal which detects a second user input, a data obtaining unit that obtains content data including an operable object, a display output unit that outputs a content image which displays the object, and a control unit that controls an operation of the object displayed in the content image, wherein the control unit executes a first operation of the object if the first user input is detected by the touch panel, and executes a second operation of the object if the second user input is received from the portable terminal by the communication unit.

18 Claims, 14 Drawing Sheets

(51) Int. Cl.
*G06F 3/01* (2006.01)
*G06F 3/02* (2006.01)
*G06F 3/0484* (2013.01)
*G06F 3/0488* (2013.01)

(52) U.S. Cl.
CPC .......... *G06F3/0488* (2013.01); *G06F 3/04845* (2013.01); *G06F 3/04883* (2013.01)

(56) References Cited

FOREIGN PATENT DOCUMENTS

| | | |
|---|---|---|
| JP | 2009-042796 A | 2/2009 |
| JP | 2009187094 A | 8/2009 |
| JP | 2010-021984 A | 1/2010 |
| JP | 2010128967 A | 6/2010 |

* cited by examiner

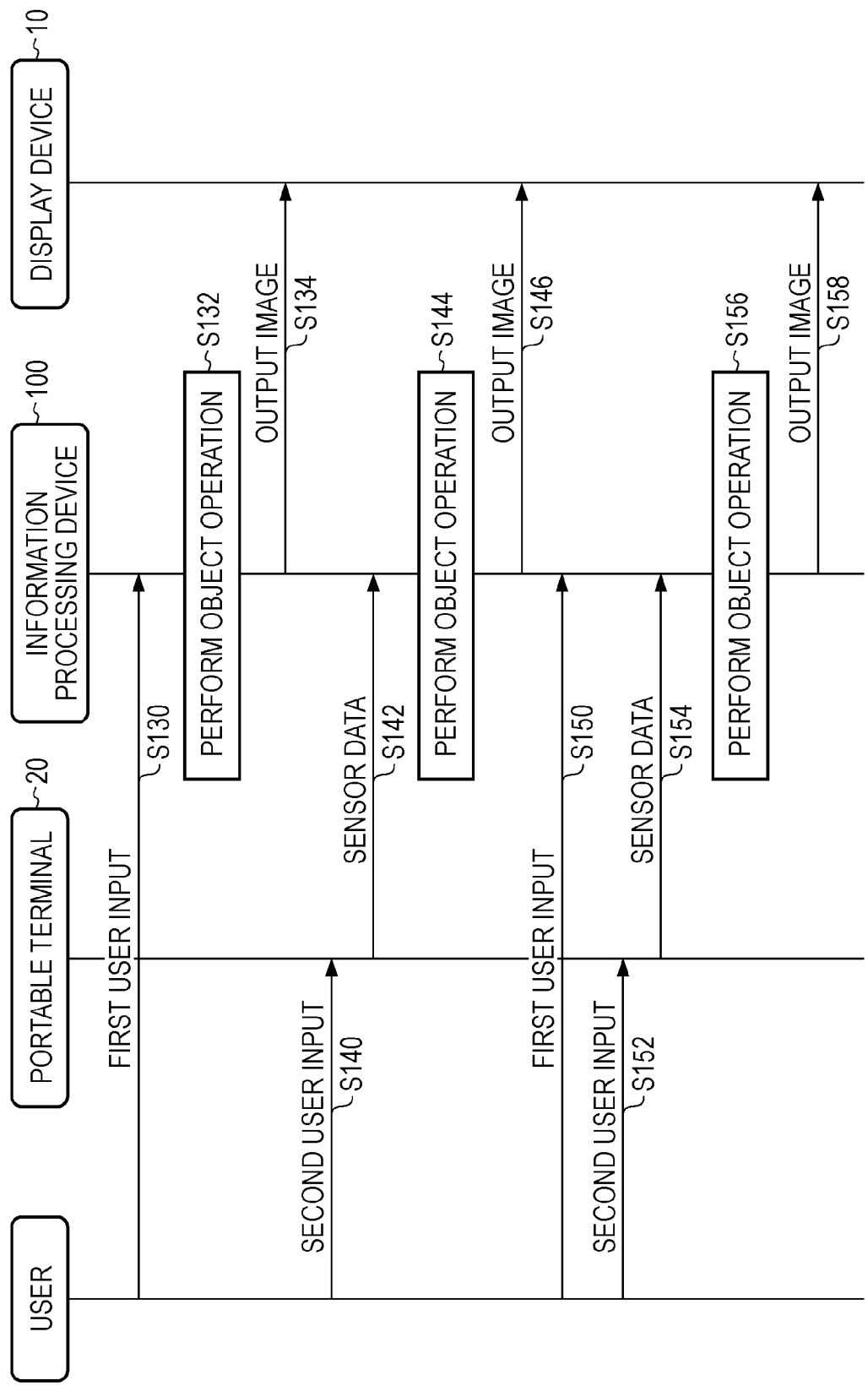

FIG. 7

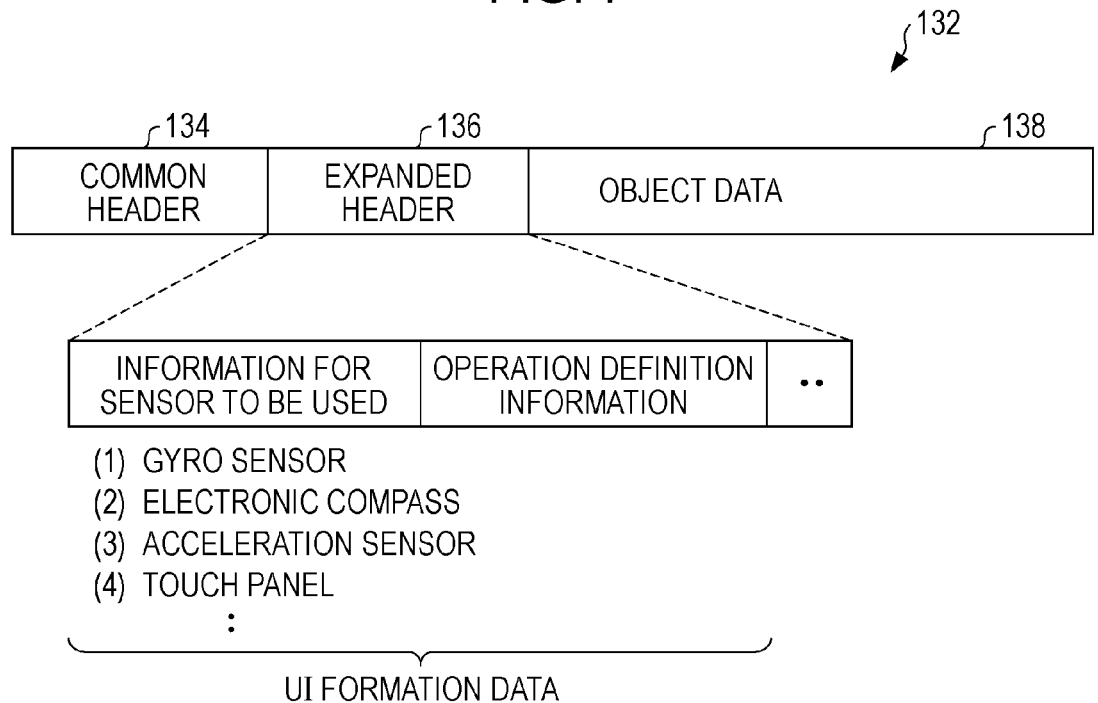

| | | |
|---|---|---|
| 134 | 136 | 138 |
| COMMON HEADER | EXPANDED HEADER | OBJECT DATA |

| INFORMATION FOR SENSOR TO BE USED | OPERATION DEFINITION INFORMATION | .. |

(1) GYRO SENSOR
(2) ELECTRONIC COMPASS
(3) ACCELERATION SENSOR
(4) TOUCH PANEL
    :

UI FORMATION DATA

FIG. 8

| ID | USER INPUT | OPERATION CONTENTS |
|---|---|---|
| Ev01 | TAP ON THE TOUCH PANEL | SELECT OBJECT |
| Ev11 | DRAG ON TOUCH PANEL (STATE 1) | MOVE OBJECT |
| Ev12 | DRAG ON TOUCH PANEL (STATE 2) | CHANGE SIZE OF OBJECT |
| Ev13 | DRAG ON TOUCH PANEL (STATE 3) | CHANGE VIEWPOINT |
| Ev21 | CHANGE POSE OF TERMINAL | ROTATE OBJECT (CHANGE MOVEMENT DIRECTION OF OBJECT) |
| Ev31 | PRESS PREDETERMINED BUTTON OF TERMINAL | SWITCH INPUT STATE |

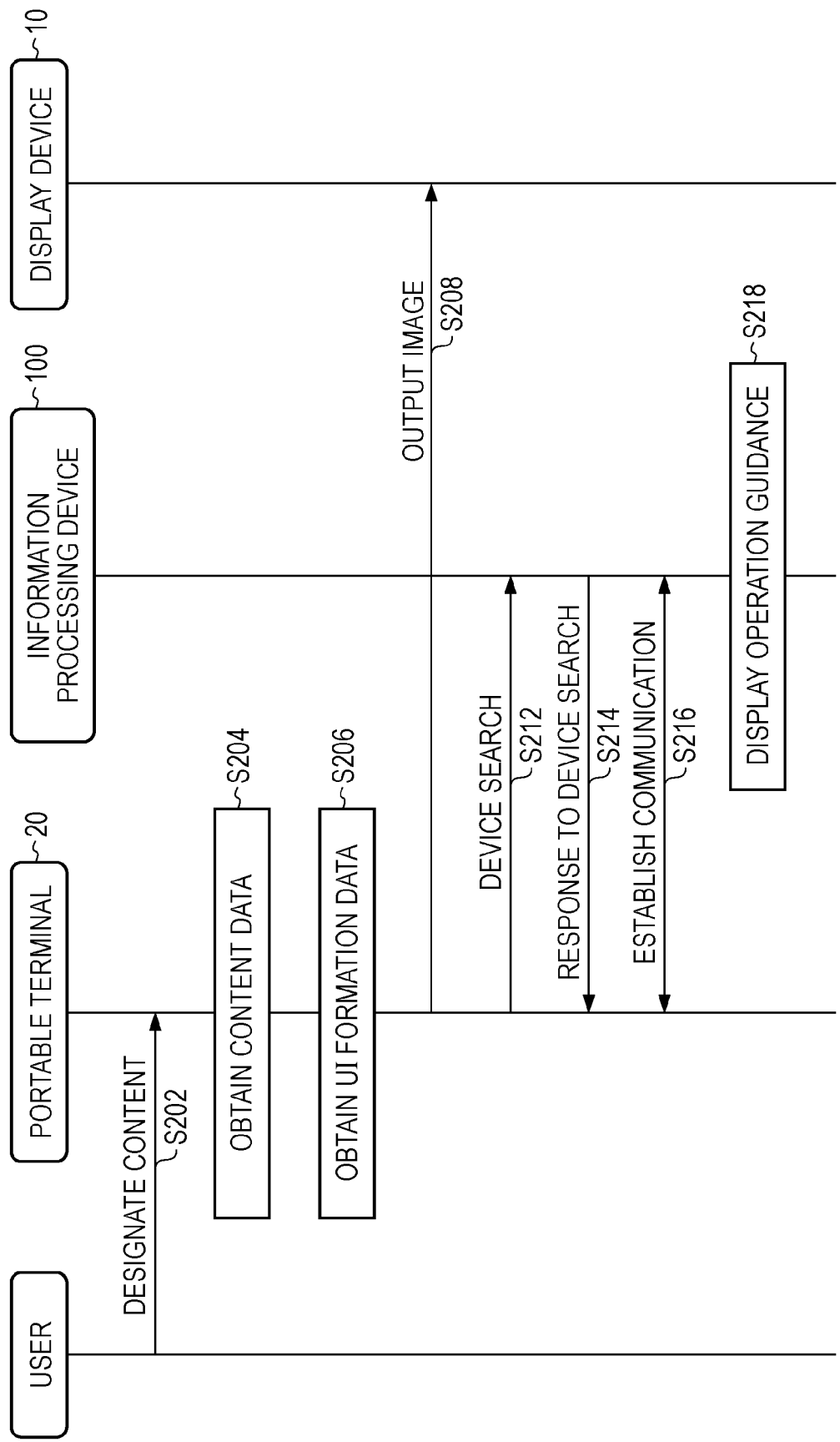

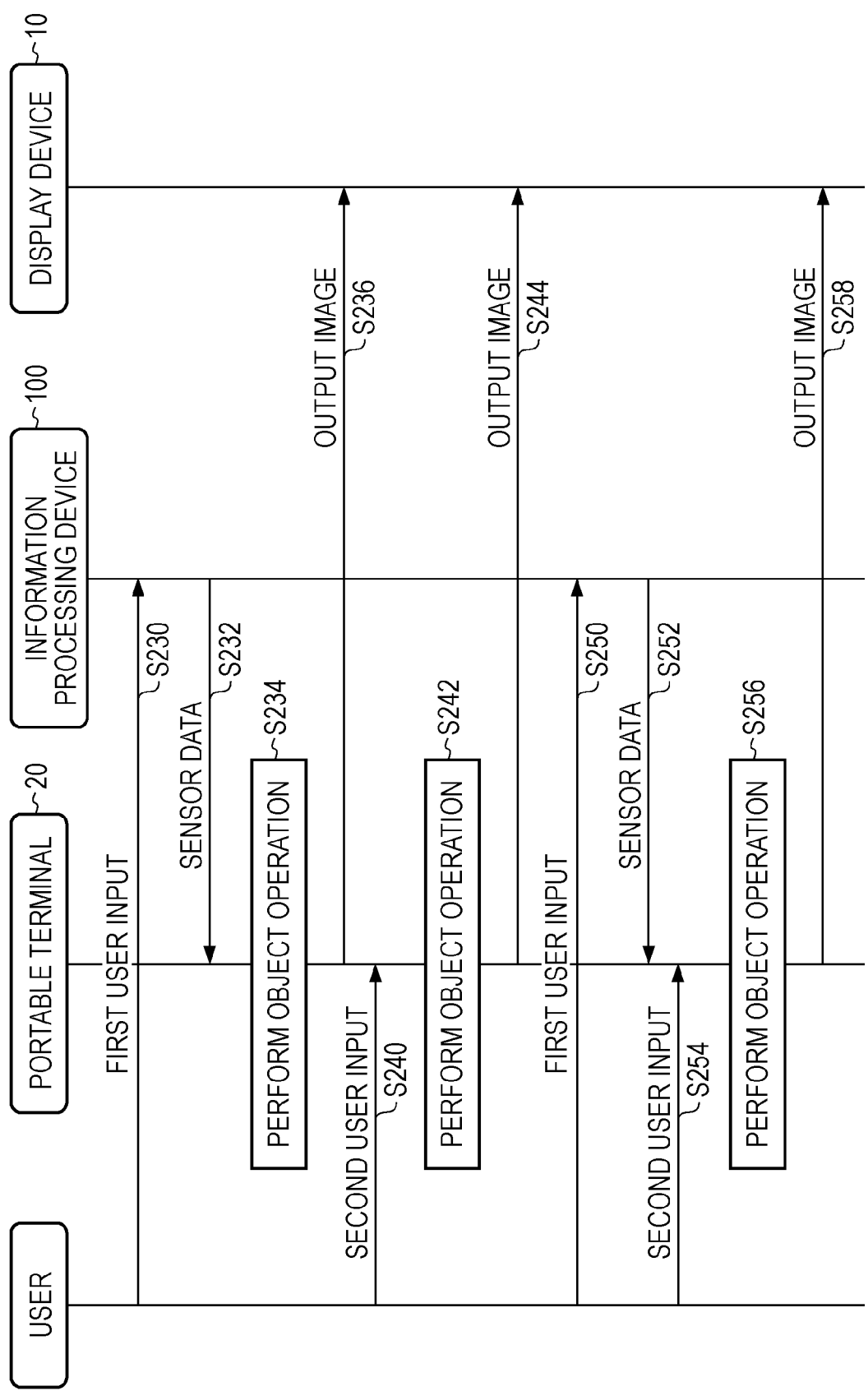

INFORMATION PROCESSING DEVICE, TABLE, DISPLAY CONTROL METHOD, PROGRAM, PORTABLE TERMINAL, AND INFORMATION PROCESSING SYSTEM

CROSS-REFERENCE TO RELATED APPLICATIONS

The present application is a continuation of U.S. patent application Ser. No. 13/289,193 filed on Nov. 4, 2011, which claims the benefit of Japanese Patent Application No. P-2010-252748 filed on Nov. 11, 2010, the disclosures of which are incorporated herein by reference.

BACKGROUND

The present disclosure relates to an information processing device, a table, a display control method, a program, a portable terminal, and an information processing system.

In recent years, various fields such as creation and use of content items, and operations of a video game, online shopping, and digital appliances have been oriented toward a user interface (UI) which promotes closer interaction between content items displayed on a screen and a user For example, Japanese Unexamined Patent Application Publication No. 2009-42796 has proposed a method of heightening the intuitiveness for an operation of an image object by using a touch on a touch pad and gestures detected via a camera in a complex manner.

SUMMARY

However, in the method of using gesture recognition, only operations corresponding to gestures registered in advance are performed, and thus it is difficult for a user to flexibly move objects. In addition, learning the registered gestures is a burden on the user. Further, for example, in a dark place, there is concern that the UI may not correctly recognize user gestures which are captured by a camera, and thus may not normally function.

It is desirable to provide an information processing device, a table, a display control method, a program, a portable terminal, and an information processing system, which are novel and improved, capable of providing a user interface for solving at least one of the problems.

According to an embodiment of the present disclosure, there is provided an information processing device including a touch panel that detects a first user input; a communication unit that communicates with a portable terminal which detects a second user input; a data obtaining unit that obtains content data including an operable object; a display output unit that outputs a content image which displays the object; and a control unit that controls an operation of the object displayed in the content image, wherein the control unit executes a first operation of the object if the first user input is detected by the touch panel, and executes a second operation of the object if the second user input is received from the portable terminal by the communication unit.

The second user input may be a user input corresponding to a change in the orientation of the portable terminal, and the second operation may be a change in the orientation of the object in the content image.

In addition, the first user input may be a drag by a user on the touch panel, and the first operation may be a size change, a movement, or a viewpoint change of the object in the content image.

Further, the first user input may be a touch by a user on the touch panel, and the first operation may be a selection of an operation target object from a plurality of operable objects.

The first user input may be a drag by a user on the touch panel, and the first operation may be a movement of the object in the content image. In this case, the control unit may control a movement direction of the object depending on the orientation of the object which is changed based on the second user input.

The portable terminal may further detect a third user input, and the control unit may switch the first operation, executed based on the first user input, between a plurality of operation candidates, if the third user input is received from the portable terminal by the communication unit.

The display output unit may output the content image to an external display device of the information processing device.

The control unit may display operation guidance showing an explanation regarding an operation of the object on the touch panel.

According to another embodiment of the present disclosure, there is provided a table including a main body with the information processing device built therein; and a top panel where a display surface of the touch panel of the information processing device is disposed at the upper side thereof.

According to still another embodiment of the present disclosure, there is provided a display control method for controlling display of a content item, in an information processing device which has a touch panel and can communicate with a portable terminal, including obtaining content data including an operable object; outputting a content image which displays the object; executing a first operation of the object displayed in the content image if the first user input is detected by the touch panel; and executing a second operation of the object displayed in the content image if the second user input is received from the portable terminal.

The second user input may be a user input corresponding to a change in the orientation of the portable terminal, and the second operation may be a change in the orientation of the object in the content image.

The first user input may be a drag by a user on the touch panel, and the first operation may be a size change, a movement, or a viewpoint change of the object in the content image.

According to still another embodiment of the present disclosure, there is provided a program enabling a computer which controls an information processing device which has a touch panel and can communicate with a portable terminal, to function as a data obtaining unit that obtains content data including an operable object; a display output unit that outputs a content image which displays the object; and a control unit that controls an operation of the object displayed in the content image, wherein the control unit executes a first operation of the object displayed in the content image if the first user input is detected by the touch panel, and executes a second operation of the object displayed in the content image if the second user input is received from the portable terminal.

According to still another embodiment of the present disclosure, there is provided a portable terminal including a communication unit that communicates with an information processing device having a touch panel which detects a first user input; a sensor that detects a second user input; a data obtaining unit that obtains content data including an operable object; a display output unit that outputs a content image which displays the object; and a control unit that controls an operation of the object displayed in the content image, wherein the control unit executes a first operation of the object if the first user input is received from the information processing device by the communication unit, and executes a second operation of the object if the second user input is detected by the sensor.

According to still another embodiment of the present disclosure, there is provided an information processing system including an information processing device that has a touch panel detecting a first user input; and a portable terminal that has a sensor detecting a second user input and can communicate with the information processing device, wherein at least one of the information processing device and the portable terminal includes, a data obtaining unit that obtains content data including an operable object; a display output unit that outputs a content image which displays the object; and a control unit that controls an operation of the object displayed in the content image, and wherein the control unit executes a first operation of the object if the first user input is detected by the touch panel, and executes a second operation of the object if the second user input is detected by the sensor.

As described above, according to the information processing device, the table, the display control method, the program, a portable terminal, and the information processing system in the embodiments of the present disclosure, it is possible to provide a UI which solves at least one problem described above and heightens flexibility of an operation more than a UI based on gesture recognition.

BRIEF DESCRIPTION OF THE DRAWINGS

FIG. 6 is a sequence diagram illustrating an example of the flow of the display control process according to the first embodiment.

FIG. 7 is a diagram illustrating an example of the UI formation data correlated with content data.

FIG. 8 is a diagram illustrating an example of the mapping between user inputs and operation contents.

FIG. 15 is a sequence diagram illustrating an example of the flow of the pre-process of the display control process according to a second embodiment.

FIG. 16 is a sequence diagram illustrating an example of the flow of the display control process according to the second embodiment.

DETAILED DESCRIPTION OF EMBODIMENTS

Figure 1:
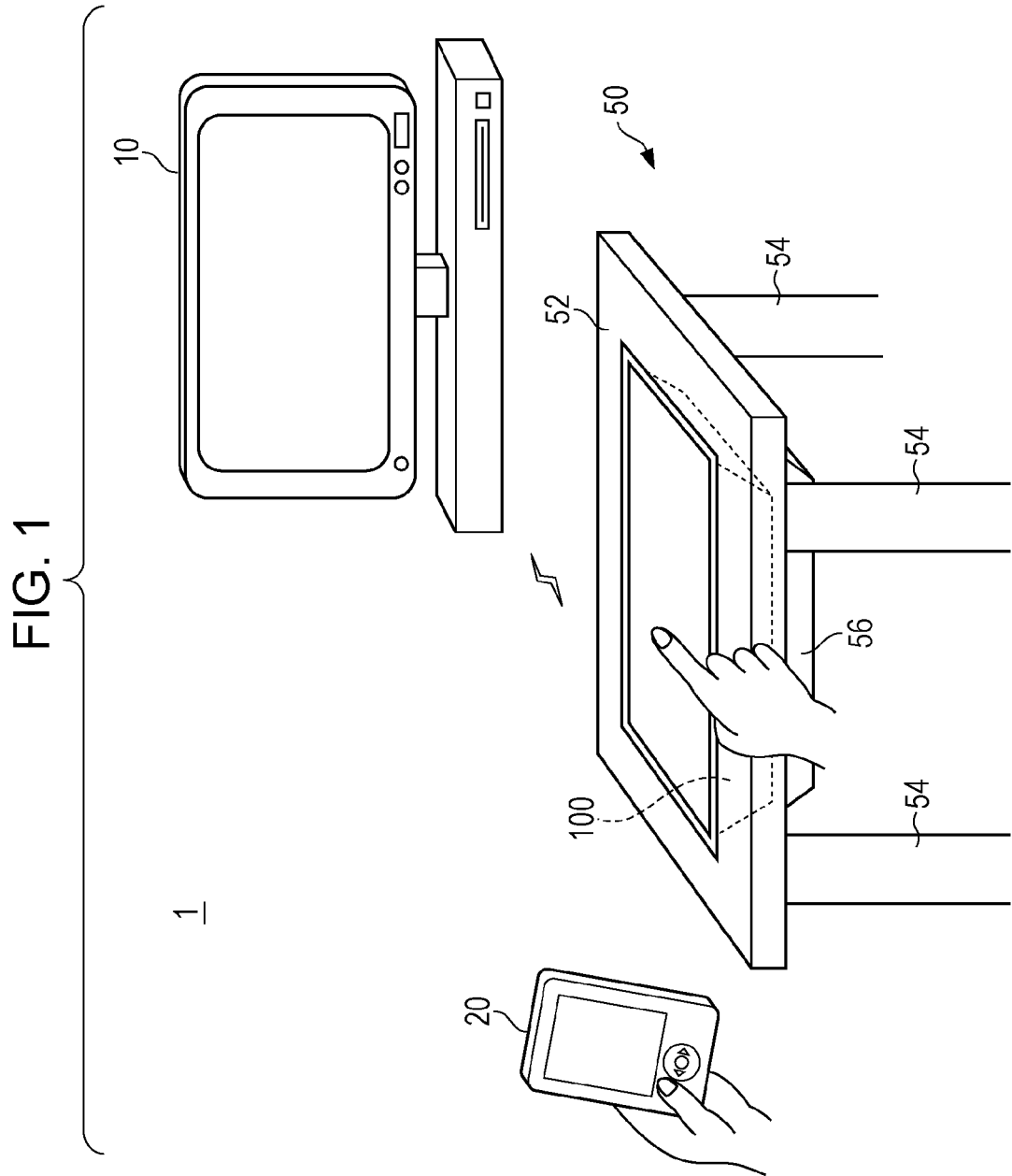
FIG. 1 is a schematic diagram illustrating an outline of an information processing system.

Hereinafter, exemplary embodiments of the present disclosure will be described with reference to the accompanying drawings. In addition, in the present specification and the drawings, constituent elements having substantially the same functional configuration are given the same reference numerals, and repeated description thereof will be omitted.

The embodiments will be described in the following order.
1. OUTLINE OF SYSTEM
2. DESCRIPTION OF FIRST EMBODIMENT
   2-1. CONFIGURATION EXAMPLE OF PORTABLE TERMINAL
   2-2. CONFIGURATION EXAMPLE OF INFORMATION PROCESSING DEVICE
   2-3. EXAMPLE OF FLOW OF DISPLAY CONTROL PROCESS
   2-4. PROCESS IN EACH DEVICE
3. SECOND EMBODIMENT
4. CONCLUSION

1. OUTLINE OF SYSTEM

FIG. 1 is a schematic diagram illustrating an outline of an information processing system 1 according to an embodiment of the present disclosure. In FIG. 1, the information processing system 1 includes a display device 10, a portable terminal 20, and an information processing device 100. In the example shown in FIG. 1, the portable terminal 20 is held by a user. In addition, the information processing device 100 is built into in a table 50 positioned in front of the user.

The display device 10 displays a content item designated by the user on a screen in the information processing system 1. The display device 10 may be, for example, a television set having a screen such as a liquid crystal display, a PDP (Plasma Display Panel), a CRT (Cathode Ray Tube), an OLED (Organic Light-Emitting Diode), a monitor for a PC (Personal Computer), or other display devices.

The portable terminal 20 is a portable terminal device having at least one sensor such as, for example, a gyro sensor, an electronic compass, or an acceleration sensor. The portable terminal 20 partially provides a UI to the user so as to operate content items displayed by the display device 10 using the above-described sensor, in cooperation with the information processing device 100. The portable terminal 20 may be a smart phone, a PDA (Personal Digital Assistant), a PND (Portable Navigation Device), a portable game terminal, or a portable music player.

The table 50 has a top panel 52, one or more legs 54, and a main body 56. The main body 56 has a module group of the information processing device 100 built therein. A display surface of a touch panel of the information processing device 100 is exposed to the surface of the top panel 52.

The information processing device 100 has a device having the touch panel which can detect a touch by the user. The information processing device 100 partially provides a UI to the user so as to operate content items displayed by the display device 10 using the above-described touch panel, in cooperation with the portable terminal 20. In the example shown in FIG. 1, the information processing device 100 is built into the table 50; however, instead thereof, the information processing device 100 may be, for example, in a PC (Personal Computer) configured separately from the table 50.

In this case, the information processing device 100 may be placed on the table 50 during the use.

The information processing device 100 may communicate with the portable terminal 20 according to an arbitrary wireless communication protocol such as, for example, a wireless LAN (Local Area Network), Bluetooth (registered trademark) or NFC (Near Field Communication). Instead of these, the information processing device 100 may communicate with the portable terminal 20 via the body of the user, for example, using a human body communication technique disclosed in Japanese Unexamined Patent Application Publication No. 2010-21984.

In the present specification, a UI realized through cooperation of the portable terminal 20 and the information processing device 100 will be described in detail. In the first embodiment described below, the information processing device 100 works as a master of the UI. In addition, in the second embodiment, the portable terminal 20 works as a master of the UI.

2. DESCRIPTION OF FIRST EMBODIMENT

2-1. Configuration Example of Portable Terminal

Figure 2:
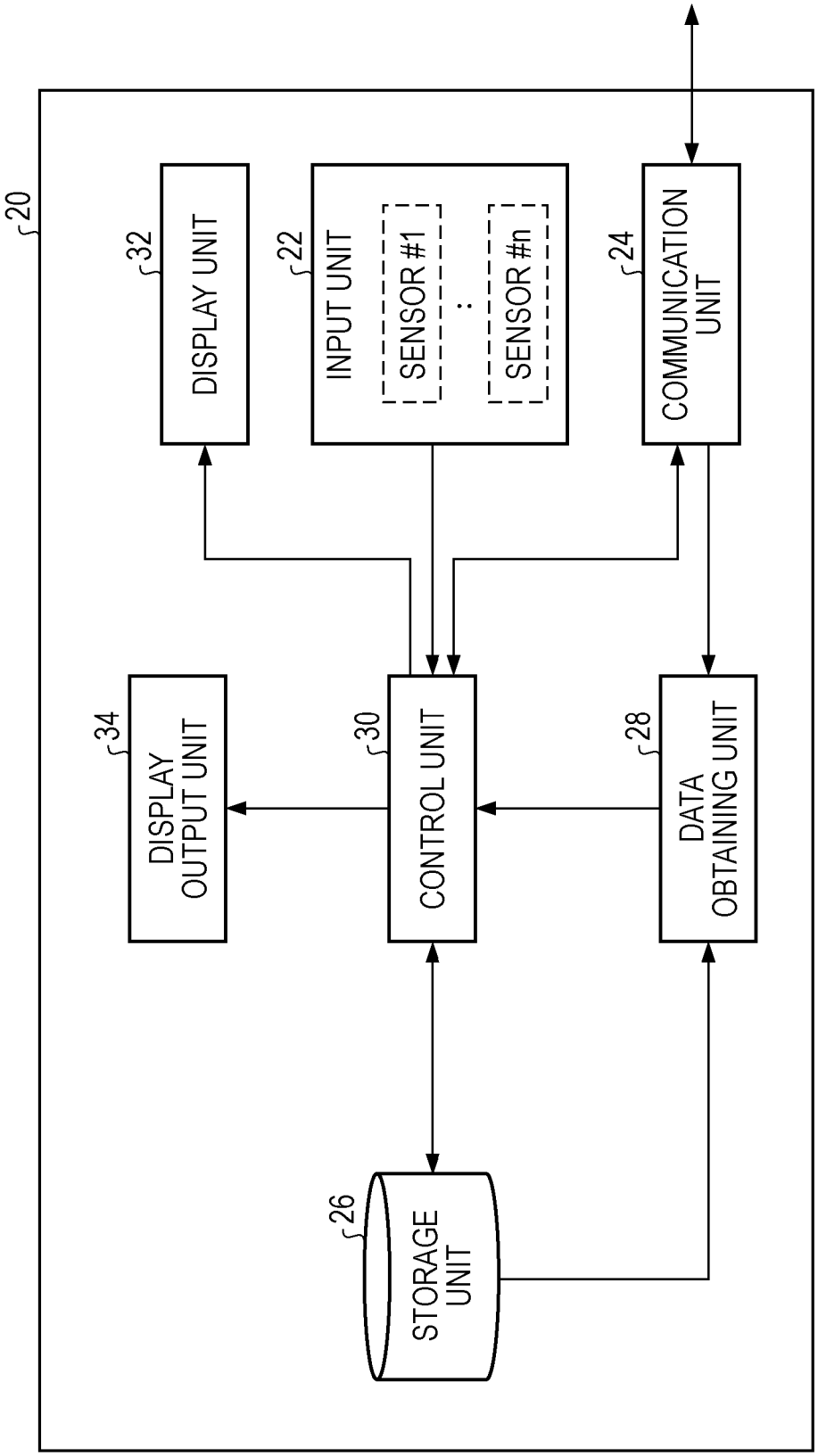
FIG. 2 is a block diagram illustrating an example of the configuration of the portable terminal according to a first embodiment.

FIG. 2 is a block diagram illustrating an example of the configuration of the portable terminal 20 according to the first embodiment. Referring to FIG. 2, the portable terminal includes an input unit 22, a communication unit 24, a storage unit 26, a data obtaining unit 28, a control unit 30, a display unit 32, and a display output unit 34.

The input unit 22 includes one or more sensors, touch panels, key pads, and buttons, or other input portions such as switches, and detects user input to the portable terminal 20. The sensor included in the input unit 22 may be, for example, a gyro sensor, an electronic compass, an acceleration sensor, or the like. The input unit 22 outputs data measured by the sensors (hereinafter, referred to as sensor data) to the control unit 30 in a time series.

The communication unit 24 includes a communication interface for communication between the portable terminal 20 and the information processing device 100. The communication unit 24 may include a wireless communication interface which implements a wireless communication protocol, such as, for example, a wireless LAN, Bluetooth (registered trademark) or NFC thereon. Instead of these, the communication unit 24 may include, for example, a human body communication interface having electrodes for the above-described human body communication. Further, the communication unit 24 may include a connection interface using which the portable terminal 20 is connected to an external network.

The storage unit 26 stores programs and control data where process logics executed by the portable terminal 20 are described, using a storage medium such as a hard disk or a semiconductor memory. In addition, the storage unit 26 may store content data including objects which can be operated by a user. The content data stored in the storage unit 26 may be image data, 2D or 3D video data, animation data, an interactive web page, or the like.

The data obtaining unit 28 may obtain content data including operable objects. For example, the data obtaining unit 28 may obtain image data or video data imaged by an imaging portion (not shown) of the portable terminal 20. In addition, the data obtaining unit 28 may obtain content data which is downloaded from an external network via the communication unit 24.

The control unit 30 controls the overall operations of the portable terminal 20 using a processor such as a CPU (Central Processing Unit), an MPU (Micro Processing Unit) or a DSP (Digital Signal Processor). For example, the control unit 30 establishes communication with the information processing device 100 via the communication unit 24. In addition, the control unit 30 outputs the sensor data input from the input unit 22 to the information processing device 100 via the communication unit 24. Further, the control unit 30 may display a list of content data stored in the storage unit 26 on the display unit 32 or screens of other devices such that the user designates content data to be reproduced.

The display unit 32 has a unique screen of the portable terminal 20. The display unit 32 may display, for example, a desktop image, an application image, a content data list, or the like of the portable terminal 20 on the screen under the control of the control unit 30.

The display output unit 34 is an output interface for outputting an image from the portable terminal 20 to the display device 10. In the embodiment, as described later, content data is reproduced by the information processing device 100, and a content image is output to the display device 10 from the information processing device 100. However, the embodiment is not limited thereto, but content data may be reproduced by the portable terminal 20, and a content image may be output to the display device 10 from the display output unit 34 of the portable terminal 20.

2-2. Configuration Example of Information Processing Device

Figure 3:
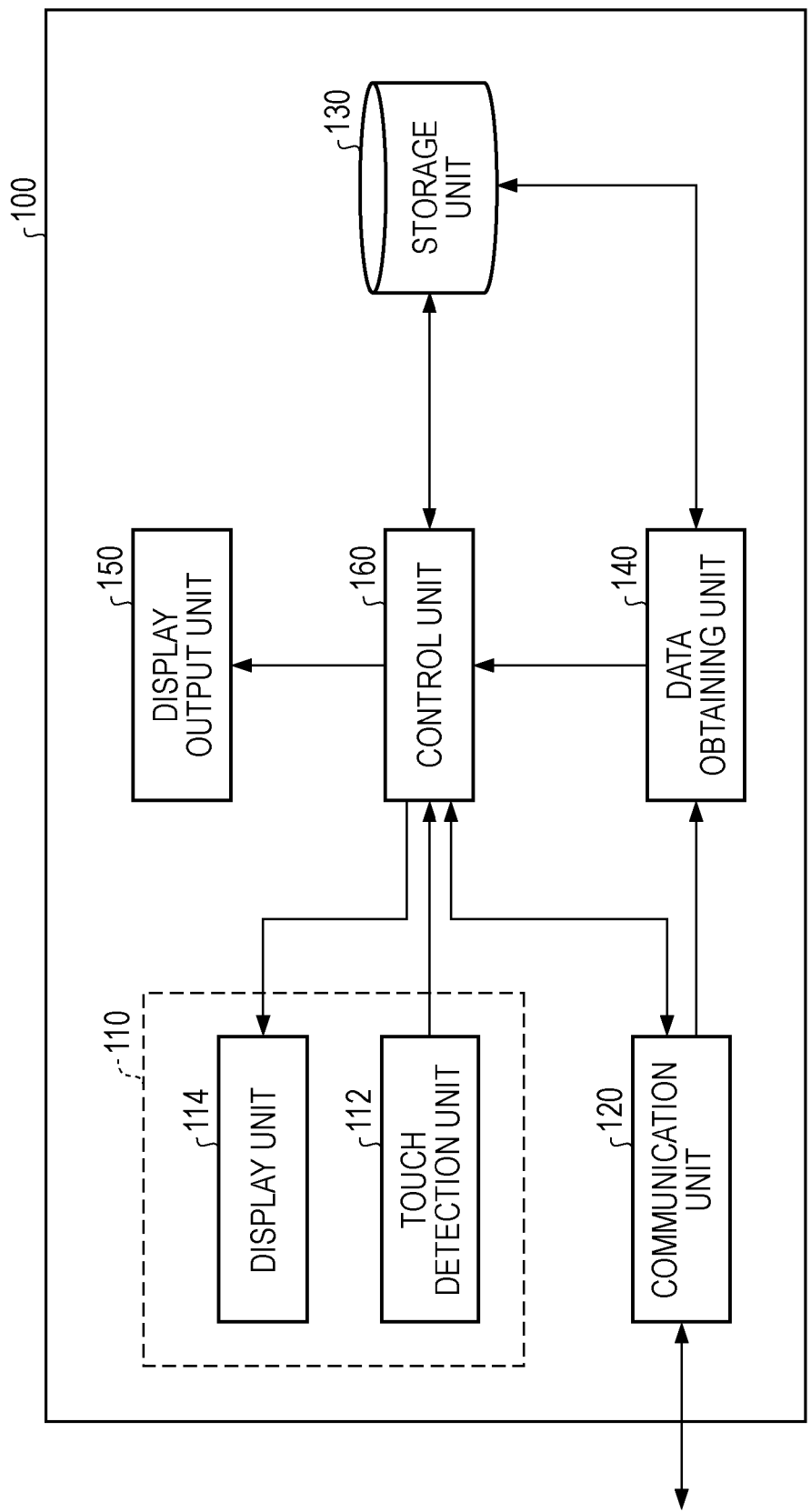
FIG. 3 is a block diagram illustrating an example of the configuration of the information processing device according to the first embodiment.

FIG. 3 is a block diagram illustrating an example of the configuration of the information processing device 100 according to the first embodiment. In FIG. 3, the information processing device 100 includes a touch detection unit 112, a display unit 114, a communication unit 120, a storage unit 130, a data obtaining unit 140, a display output unit 150, and a control unit 160.

The touch detection unit 112 and the display unit 114 form a touch panel 110. The touch detection unit 112 detects, for example, a touch by the user on the display surface exposed to the surface of the top panel 52 of the table 50 shown in FIG. 1, and outputs an electric signal indicating a touched position to the control unit 160. The display unit 114 displays an image input from the control unit 160 on a display surface of the touch panel. An image displayed by the display unit 114 includes an image of operation guidance for objects displayed in a content image output to the display device 10.

The communication unit 120 includes a communication interface for communication between the information processing device 100 and the portable terminal 20. The communication unit 120 may include a wireless communication interface which implements a wireless communication protocol, such as, for example, a wireless LAN, Bluetooth (registered trademark) or NFC thereon. Instead thereof, the communication unit 120 may include, for example, a human body communication interface having electrodes for the above-described human body communication. Further, the communication unit 120 may include a connection interface using which the information processing device 100 connects to an external network (the Internet, a DLNA network, or the like).

Figure 4:
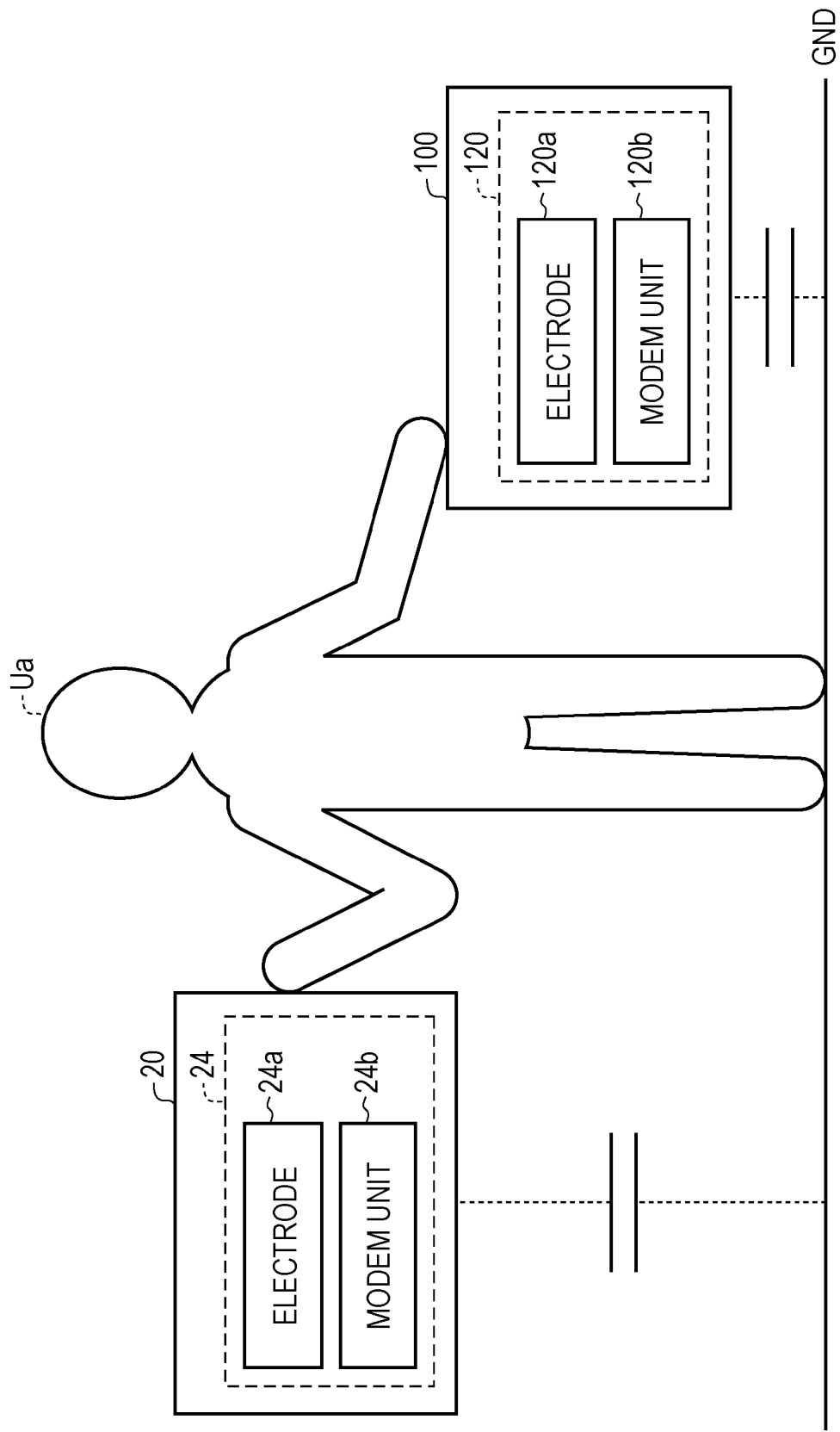
FIG. 4 is a diagram illustrating human body communication between the information processing device and the portable terminal.

FIG. 4 is a diagram illustrating the human body communication which is an example of the communication between the portable terminal 20 and the information processing device 100. In FIG. 4, a user Ua grasps (or installs) the portable terminal 20 and comes into contact with the information processing device 100. In the example shown in FIG.

4, the communication unit 24 of the portable terminal 20 includes an electrode 24a and a modulation and demodulation (modem) unit 24b. The electrode 24a is capacitively coupled with the ground or air having a reference potential (GND: ground) to thereby form a capacitor. In a similar manner, the communication unit 120 of the information processing device 100 includes an electrode 120a and a modem unit 120b. The electrode 120a is also capacitively coupled with the ground or air having the reference potential to thereby form a capacitor. A communication signal may be modulated due to a potential difference between the electrodes and be transmitted between the portable terminal 20 and the information processing device 100 via the body of the user Ua. In addition, the human body communication is only an example, and communication between the portable terminal 20 and the information processing device 100 may be performed via other communication forms.

Referring to FIG. 3 again, description of an example of the configuration of the information processing device 100 according to the embodiment is continued.

The storage unit 130 stores programs and control data where process logics executed by the information processing device 100 are described, using a storage medium such as a hard disk or a semiconductor memory. In addition, the storage unit 130 stores content data including objects which can be operated by a user.

The data obtaining unit 140 obtains content data including operable objects. For example, the data obtaining unit 140 may content data stored in the storage unit 130. In addition, the data obtaining unit 140 may obtain content data stored in the storage unit 26 of the portable terminal 20 via the communication unit 120. In addition, the data obtaining unit 140 may obtain content data which is downloaded from an external network via the communication unit 120. The content data obtained by the data obtaining unit 140 may be reproduced by the control unit 160.

The display output unit 150 is an output interface for outputting an image from the information processing device 100 to the display device 10. The display output unit 150 may be a video output interface implementing a video transmission protocol such as, for example, HDMI (High Definition Multimedia Interface) or DVI (Digital Visual Interface). The output interface of the display output unit 150 may be a wired interface or a wireless interface.

The control unit 160 controls the overall operations of the information processing device 100 using a processor such as a CPU, an MPU, or a DSP. For example, the control unit 160 displays a list of content data obtained by the data obtaining unit 140 on the display unit 114 or screens of other devices such that a user designates content data to be reproduced. In addition, the control unit 160 displays a content image obtained by reproducing the designated content data on the display device 10 via the display output unit 150. The control unit 160 establishes communication with the portable terminal 20 via the communication unit 120. Further, the control unit 160 controls an operation of objects displayed in a content image in response to a first user input detected by the touch panel 110 and a second user input detected by the portable terminal 20. The second user input detected by the portable terminal 20 can be recognized through sensor data received by the communication unit 120.

2-3. Example of Flow of Display Control Process

An example of the flow of the display control process performed by the information processing system 1 will be described with reference to FIGS. 5 and 6.

(1) Pre-Process

Figure 5:
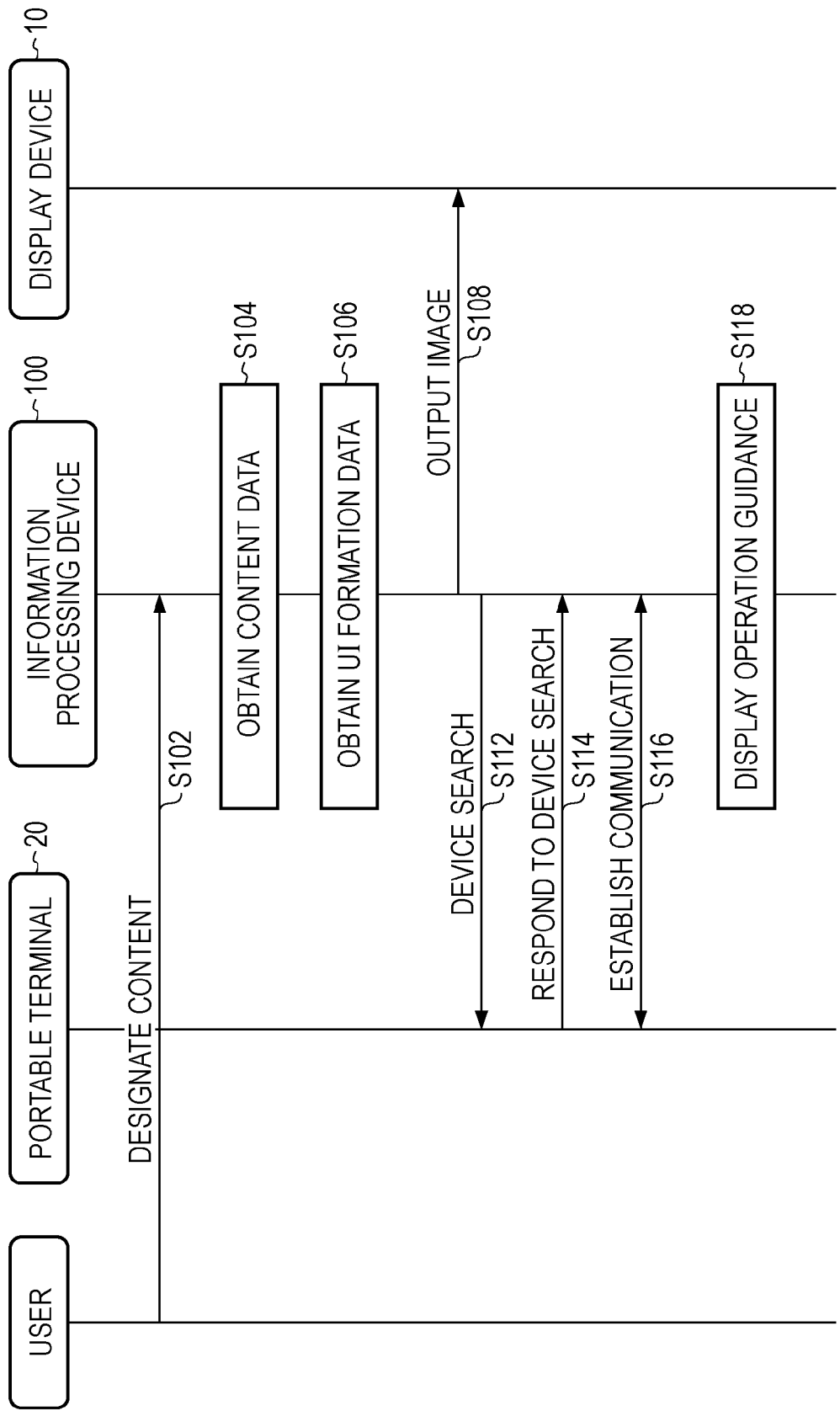
FIG. 5 is a sequence diagram illustrating an example of the flow of the pre-process of the display control process according to the first embodiment.

FIG. 5 is a sequence diagram illustrating an example of the flow of the pre-process of the display control process according to the embodiment. Referring to FIG. 5, an example of the sequence of the pre-process which involves the user, the portable terminal 20, the information processing device 100, and the display device 10 is shown.

First, the pre-process of the display control process starts when the user designates content data to be reproduced (step S102). For example, the user selects a desired item from a list of content data displayed on the display surface of the touch panel 110 of the information processing device 100 and touches the selected item, thereby designating content data.

Next, the data obtaining unit 140 of the information processing device 100 obtains the designated content data from the storage unit 130 of the information processing device 100, the storage unit 26 of the portable terminal 20, or an external network (step S104). In addition, the data obtaining unit 140 obtains UI formation data which is correlated with the content data in step S104, and defines a correspondence relationship between the user input and an operation of objects included in the content data (step S106).

FIG. 7 is a diagram illustrating an example of the UI formation data correlated with content data. FIG. 7 shows an example of the data format of content data 132. In the data format in FIG. 7, the content data 132 includes a common header 134, an expanded header 136, and object data 138. The common header 134 stores standard header information such as, for example, the kind of content data, the creation date, and the data length therein. The object data 138 stores actual data of objects forming a content item therein.

The UI formation data is stored in, for example, the expanded header 136. The UI formation data includes, for example, information on a sensor to be used, and operation definition information. The information on a sensor to be used is information specifying a sensor used for operation of the objects included in the actual data in the object data 138. The information on a sensor to be used may be a bit stream or or a code value indicating use or nonuse for each kind of sensor such as, for example, a gyro sensor, an electronic compass, an acceleration sensor, and a touch panel. The operation definition information is information which defines mapping between user inputs detected via the above-described sensor and more abstract operation contents of an object.

FIG. 8 is a diagram illustrating an example of the mapping between user inputs and operation contents. FIG. 8 shows the kinds of user inputs and corresponding operation contents in relation to six input events Ev01, Ev11, Ev12, Ev13, Ev21, and Ev31 of the user inputs. For example, a tap on the touch panel of the information processing device 100 corresponds to a selection of an object to be operated (event Ev01). A drag on the touch panel corresponds to one of a movement, a size change, and a viewpoint change of an object, according to three kinds of input states (events Ev11 to Ev13). A change in the orientation detected by the sensor of the portable terminal 20 corresponds to rotation (3D rotation or 2D rotation) of an object (event Ev21). A movement direction of an object corresponding to the input event Ev11 may be changed when the orientation of the object is changed through the rotation of the object. For example, a UI may be realized in such a manner that if an object stands upright, the object travels in a straight line according to the input event Ev11, and if the object is tilted, the object is moved in a curved manner according to the input event Ev11. The pressing of a predetermined button of the portable terminal 20 corresponds to switching between input states (event Ev31).

The definition of the mapping between the user inputs and the operation contents in FIG. 8 is only an example. For example, among the drags on the touch panel, a drag in the vertical direction may be mapped onto a size change of an object, a drag in the horizontal direction may be mapped onto a movement of an object. In addition, mapping between the user inputs and the operation contents may be customized or personalized for each user. However, when the UI functions for operating objects are distributed into the portable terminal 20 and the touch panel 110 of the information processing device 100, a change in the orientation of an object, that is, rotation of the object is preferably mapped onto a change in the orientation of the portable terminal 20. This is because the portable terminal 20 can be flexibly changed in the orientation in a state of being held by the user, whereas the touch panel 110 of the information processing device 100 is disposed on the table 50 so as to be substantially fixed. If a control of the orientation of an object in the portable terminal 20 and a control of a movement of the object in the touch panel 110 are performed at the same time, the user can flexibly operate the object with both the hands.

In addition, an example where the UI formation data is included in the header of the content data has been described here. However, for example, in a case where a UI configuration is standardized for a specific content item, the UI formation data may be omitted from the content data. In addition, only a URL (Uniform Resource Locator) indicating the position of the UI formation data is described in the content data, and the information processing device 100 may access the URL and additionally obtain the UI formation data.

Referring to FIG. 5 again, the description of an example of the pre-process of the display control process is continued.

If the content data designated by the user is obtained, the control unit 160 of the information processing device 100 outputs a content image in an initial state via the display output unit 150 and displays the content image on the display device 10 (step S108).

If the UI formation data correlated with the content data, the control unit 160 searches for devices having the sensor designated by the information on a sensor to be used inside the UI formation data (step S112). For example, the communication unit 120 transmits a query packet having a predetermined format to peripheral devices of the information processing device 100, thereby performing the device search. If the query packet is received from the information processing device 100, the portable terminal 20 responds to the device search by transmitting a response packet to the query packet (step S114).

Figure 9:
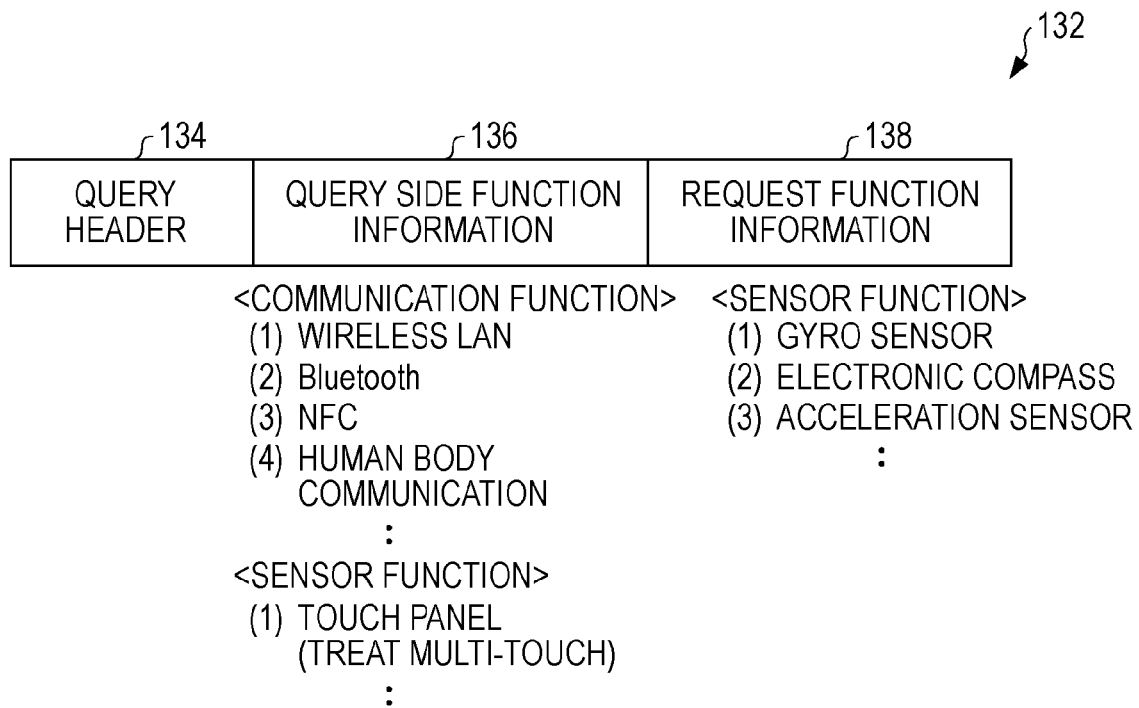
FIG. 9 is a diagram illustrating an example of the packet format of the query packet for device search.

FIG. 9 is a diagram illustrating an example of the packet format of the query packet for the device search. Referring to FIG. 9, an exemplary query packet 132 includes a query header 134, query side function information 136, and request function information 138. The query header 134 stores header information such as, for example, ID of the query packet, ID of the information processing device 100, the kind of packet format, and the packet length therein. The query side function information 136 includes information on the capabilities (for example, the kind of available communication protocol, the kind of sensor, and the like) of the information processing device 100 which is the query side. The request function information 138 includes information on functions requested for a device receiving the query. In the example shown in FIG. 9, a list of sensors requested to realize a desired UI is included in the request function information 138.

Figure 10:
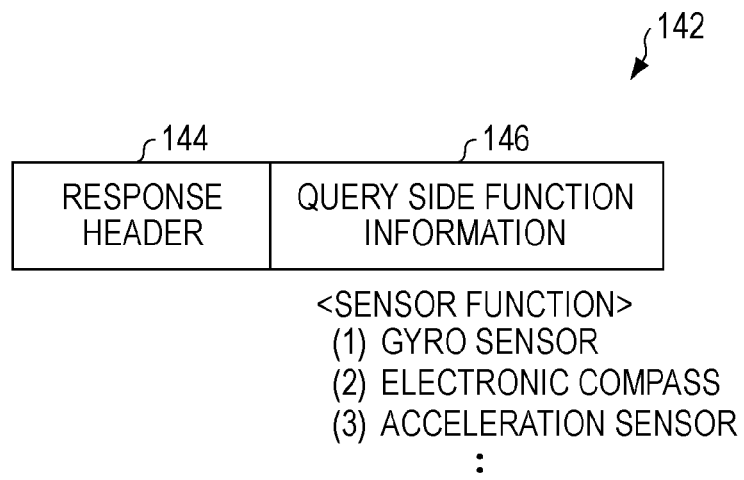
FIG. 10 is a diagram illustrating an example of the packet format of the response packet to the query packet in FIG. 9.

FIG. 10 is a diagram illustrating an example of the packet format of the response packet to the query packet shown in FIG. 9. In FIG. 10, an exemplary response packet 142 includes a response header 144, and response side function information 146. The response header 144 stores header information such as, for example, ID of the response packet, ID of the corresponding query packet, ID of the portable terminal 20, and the packet length therein. The response side function information 146 includes information on the capabilities of the portable terminal 20 which is a response side. In the example shown in FIG. 10, the response side function information 146 includes a list of sensors available to the portable terminal 20 of the sensor group indicated by the request function information 138 of the query packet.

Referring to FIG. 5 again, the description of an example of the pre-process of the display control process is continued.

If the response packet is received from the portable terminal 20, the control unit 160 of the information processing device 100 establishes communication with the portable terminal 20 through, for example, exchange of connection information, mutual authentication, and the like (step S116).

Figure 11:
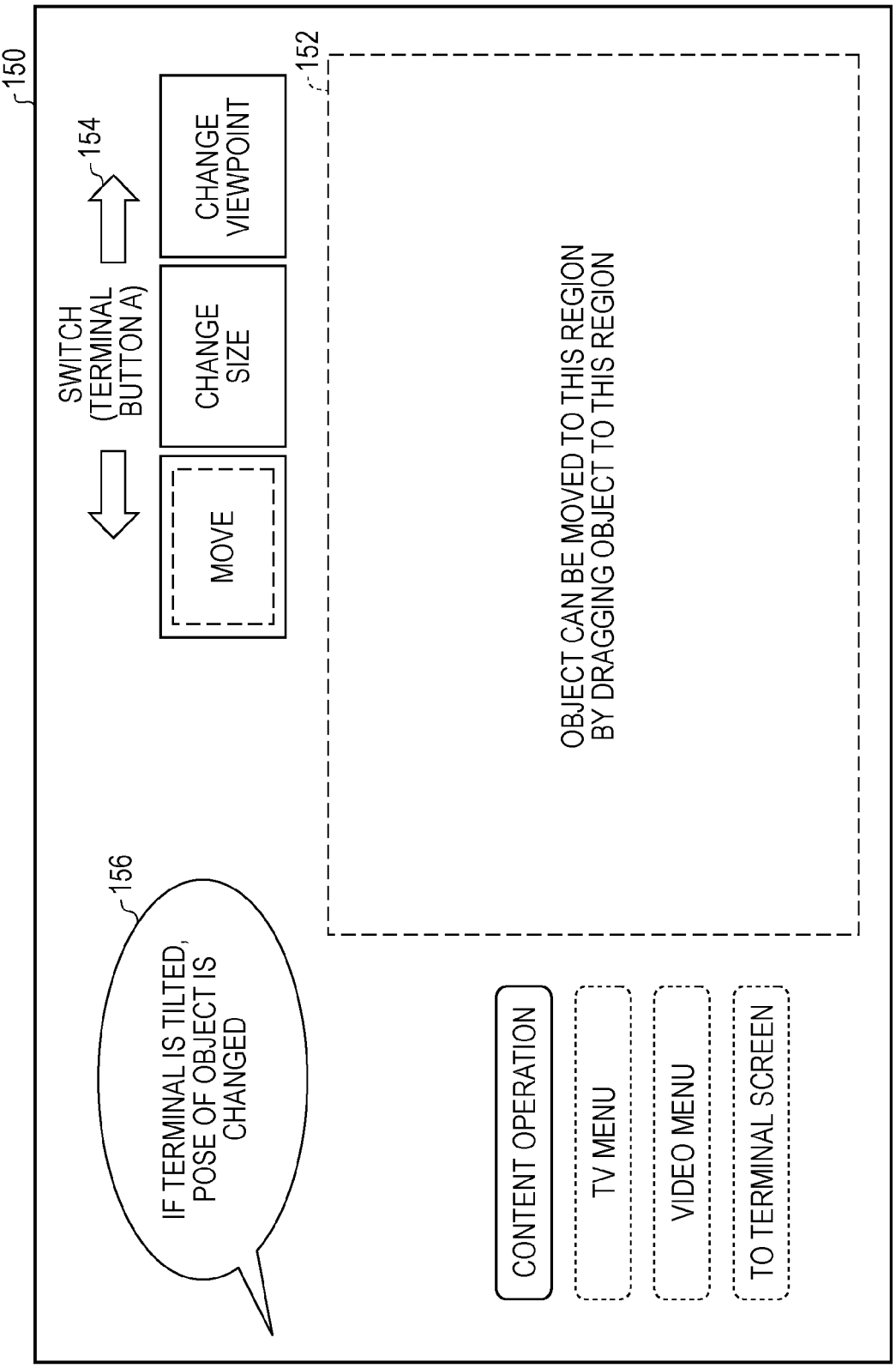
FIG. 11 is a diagram illustrating an example of the operation guidance displayed on the touch panel of the information processing device.

Next, the control unit 160 displays operation guidance on the display unit 114 based on the operation definition information included in the UI formation data (step S118). FIG. 11 is a diagram illustrating an example of the operation guidance displayed by the display unit 114. In FIG. 11, exemplary operation guidance 150 includes a touch region range 152, an input state display portion 154, and a terminal operation explanation portion 156. The touch region range 152 is a frame indicating a region where a user performs a user input, such as a touch or a drag. The input state display portion 154 indicates a current input state among a plurality of input states and a switching method of the input state. The terminal operation explanation portion 156 indicates an explanation for what kind of operation is performed using the portable terminal 20. In addition, in a case where there is a sensor which is not available to the portable terminal 20, an explanation for the sensor may be shown in the terminal operation explanation portion 156. The user confirms the operation guidance and uses both the portable terminal 20 and the touch panel 110 of the information processing device 100, thereby operating operable objects displayed by the display device 10.

When the operation guidance as exemplified in FIG. 11 is displayed, the pre-process of the display control process in the information processing system 1 is completed.

(2) Display Control Process

FIG. 6 is a sequence diagram illustrating an example of the flow of the display control process according to the embodiment. The display control process subsequent to the pre-process involves the user, the portable terminal 20, the information processing device 100, and the display device 10. In addition, the display control process is typically performed by an event driving method. Therefore, the procedures and the number of the user inputs shown in FIG. 6 are merely for convenience of description. In the following description, a user input detected by the touch panel 110 of the information processing device 100 is referred to as a first user input, and a user input detected by the portable terminal 20 and received by the communication unit 120 of the information processing device 100 is referred to as a second user input.

For example, if the first user input is detected by the touch panel 110 (step S130), the control unit 160 executes a first operation of an object displayed in the content image (step S132). As described with reference to FIG. 8, for example, the first user input may be a touch by the user on the touch panel 110, and the first operation may be a selection of an operation target object from a plurality of operable objects. Further, for example, the first user input may be a drag by the user on the touch panel 110, and the first operation may be a size change, a movement, or a viewpoint change of an object. The control unit 160 analyzes the first user input based on an input state, and outputs a content image according to the first operation (step S134).

In addition, for example, if the second user input is detected by the portable terminal 20 (steps S140 and S142), the control unit 160 executes a second operation of an object displayed in the content image (step S144). As described with reference to FIG. 8, for example, the second user input may be a change in the orientation of the portable terminal 20, and the second operation may be a change in the orientation of an object. The control unit 160 recognizes the second user input based on the sensor data received by the communication unit 120, and outputs a content image according to the second operation (step S146).

For example, if the first user input is detected by the touch panel 110 (step S150) and the second user input is detected by the portable terminal 20 (steps S152 and S154), an operation of an object different from the first and second operations may be executed (step S156). For example, the object may be moved based on the first user input in a different direction according to the orientation of the object which has been changed because the orientation of the object is changed based on the second user input. The control unit 160 may output a content image corresponding to such an operation (step S158).

Figure 12:
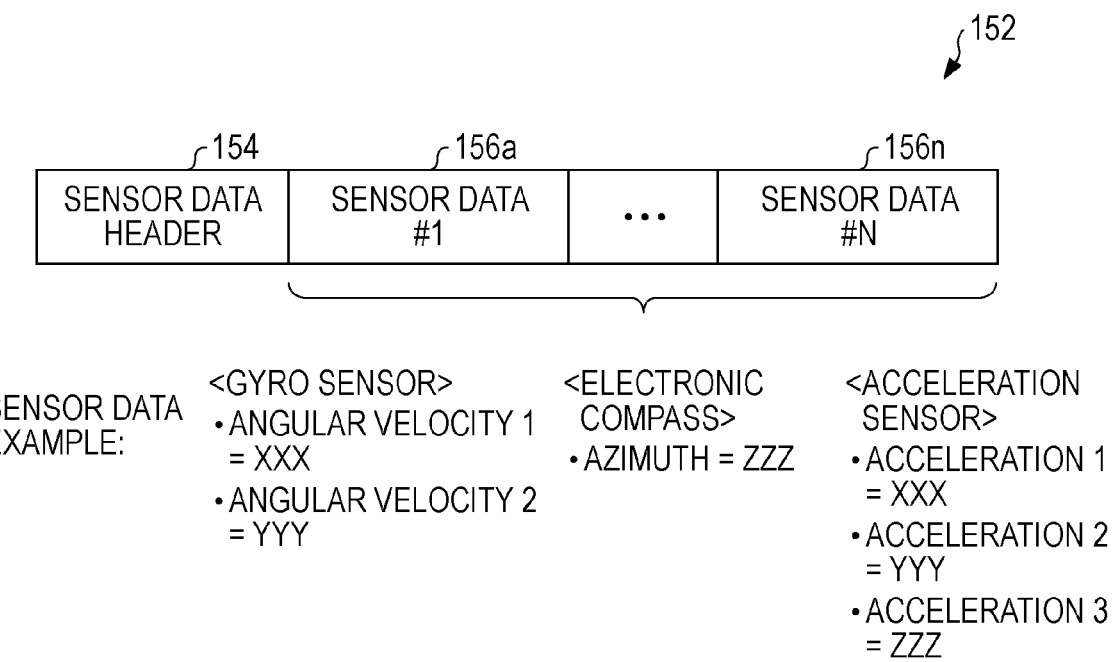
FIG. 12 is a diagram illustrating an example of the packet format of the sensor data packet.

FIG. 12 is a diagram illustrating an example of the packet format of the sensor data packet which may be transmitted to the information processing device 100 from the portable terminal 20 in steps S142 and S154 shown in FIG. 6. In FIG. 12, an exemplary sensor data packet 152 includes a sensor data header 154, and one or more sensor data fields 156a to 156n. The sensor data header 154 may include, for example, ID of the portable terminal 20, the number of sensor data fields in the packet, a time stamp indicating measurement time, and the like. Each of the sensor data fields 156a to 156n may include a measurement result according to the kind of sensor. For example, the sensor data may include an angular velocity for each rotation direction in relation to the gyro sensor, an azimuth in relation to the electronic compass, a triaxial acceleration in relation to the acceleration sensor, and a data value of a touched position, a dragged position, or the like in relation to the touch panel.

2-4. Process in Each Device (1) Master Side Device

Figure 13:
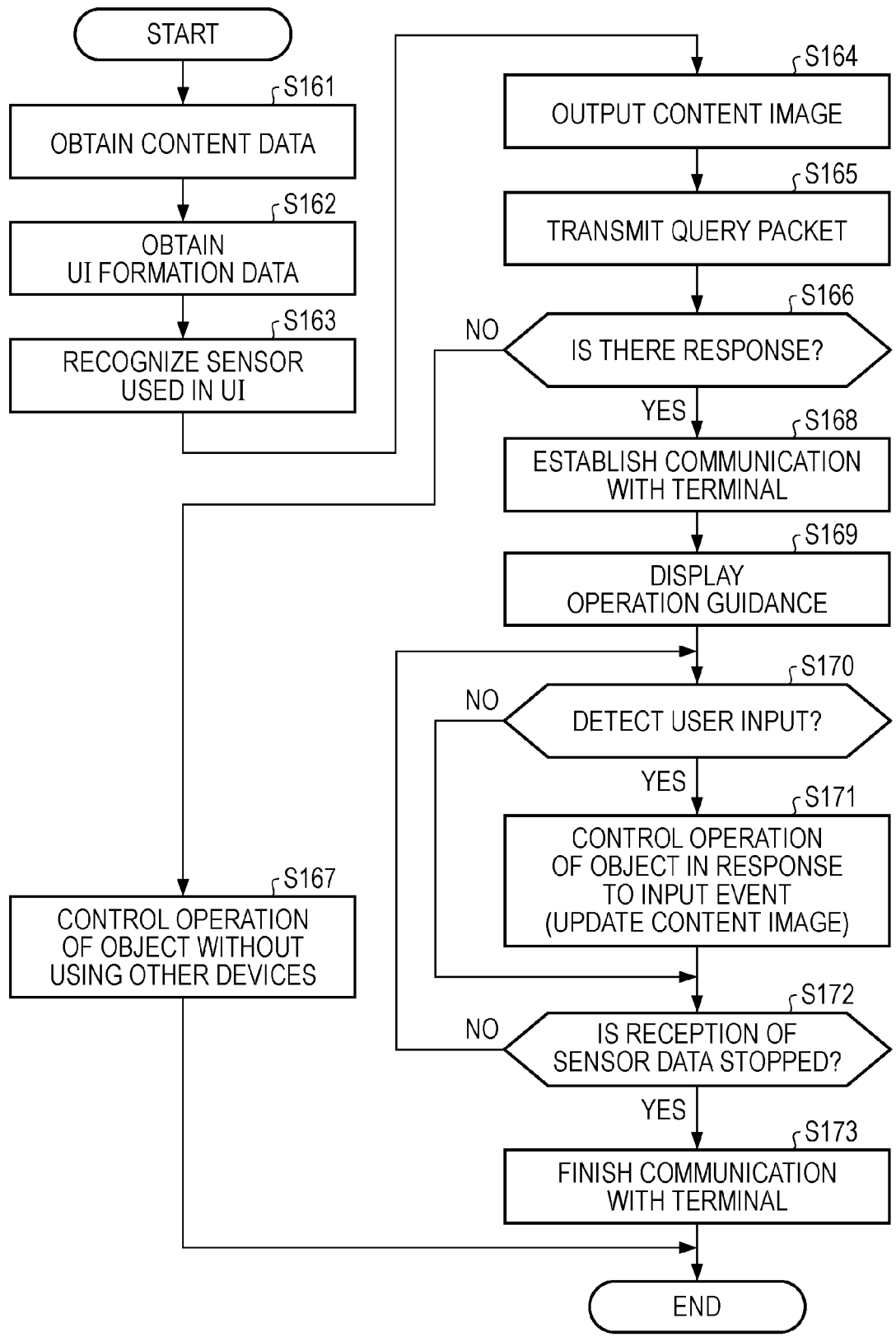
FIG. 13 is a flowchart illustrating an example of the flow of processes performed by the information processing device according to the first embodiment.

FIG. 13 is a flowchart illustrating an example of the flow of the processes performed by the information processing device 100 working as a master of the UI according to the embodiment.

In FIG. 13, first, the data obtaining unit 140 obtains content data (step S161). Next, the data obtaining unit 140 obtains UI formation data correlated with the content data (step S162). The control unit 160 recognizes a sensor, which is used in a UI for an operation of objects included in the content data, from the UI formation data (step S163). In addition, the control unit 160 outputs a content image in an initial state to the display device 10 via the display output unit 150 (step S164).

Thereafter, the communication unit 120 transmits a query packet for device search (step S165). The information processing device 100 waits for responses from peripheral devices (step S166). Here, if there is no response even after a predetermined waiting time has elapsed, the control unit 160 controls an operation of an object without using other devices (step S167). On the other hand, for example, if a response packet is received from the portable terminal 20, the control unit 160 establishes communication with the portable terminal (step S168). In addition, the control unit 160 displays the operation guidance as exemplified in FIG. 11 on the display unit 114 according to the UI formation data (step S169).

Thereafter, the control unit 160 waits for a user input to be detected (step S170). If the user input is detected, the control unit 160 recognizes an input event from the user input, and controls an operation of an object according to the recognized input event. In addition, the control unit 160 updates a content image output to the display device 10 (step S171). Such an operation of an object may be continued until, for example, reception of sensor data from the portable terminal 20 stops (step S172). In addition, if the sensor data stops being received, the control unit 160 finishes the communication with the portable terminal 20 (step S173). Further, the communication between the portable terminal 20 and the information processing device 100 may be finished due to an explicit instruction from a user or other events, and not the stop of sensor data reception.

(2) Slave Side Device

Figure 14:
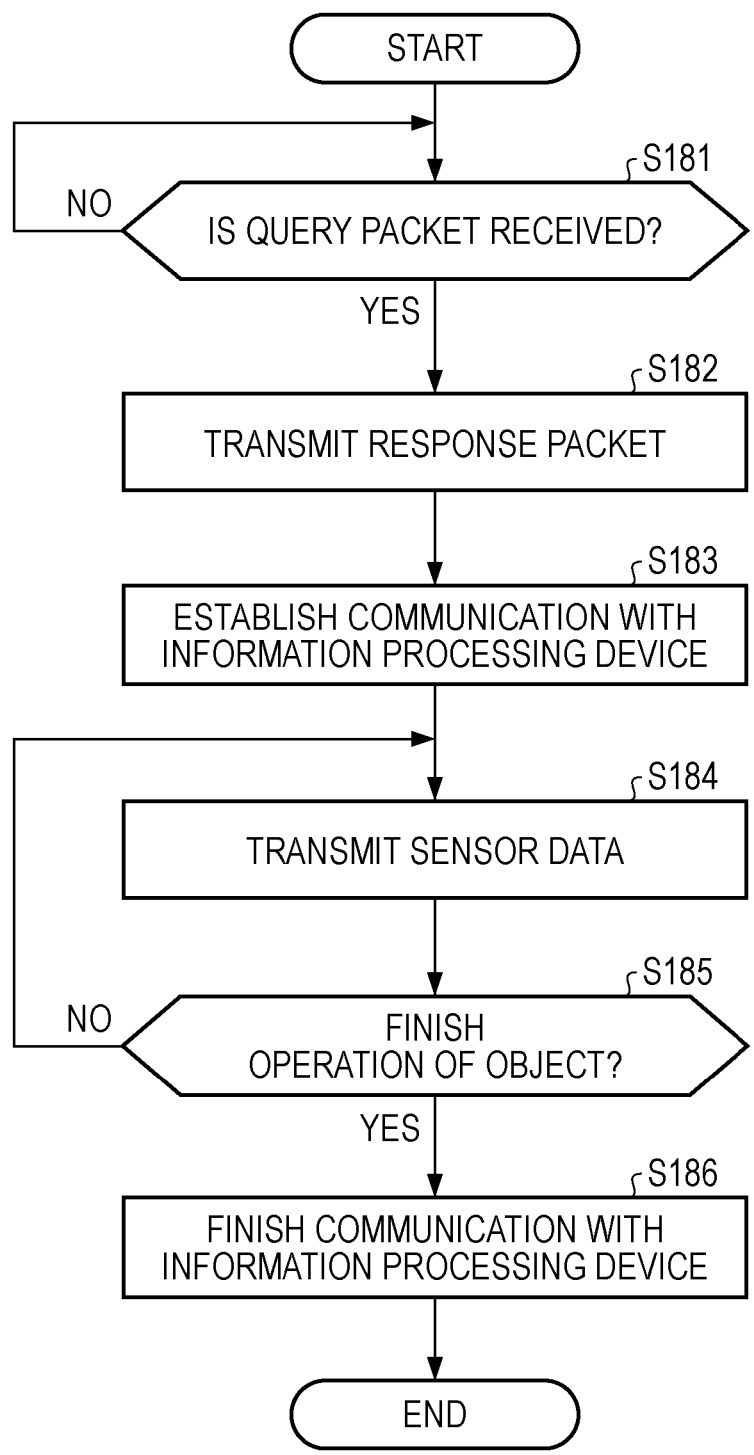
FIG. 14 is a flowchart illustrating an example of the flow of processes performed by the portable terminal according to the first embodiment.

FIG. 14 is a flowchart illustrating an example of the flow of the processes performed by the portable terminal 20 working as a slave of the UI according to the embodiment.

First, the communication unit 24 of the portable terminal 20 waits for the query packet for device search to be received from the information processing device 100 (step S181). If the query packet is received by the communication unit 24, the control unit 30 generates a response packet including a list of sensors available to the portable terminal and generates the response packet to the information processing device 100 via the communication unit 24 (step S182). In addition, the control unit 30 establishes communication with the information processing device 100 (step S183).

Thereafter, the control unit 30 continues to transmit data measured by the sensor of the input unit 22 to the information processing device 100 via the communication unit 24 as sensor data (step S184). In addition, the control unit 30 may transmit an input event such as pressing of a predetermined button to the information processing device 100. The communication between the portable terminal 20 and the information processing device 100 may be continued, for example, until an instruction for finishing an operation of an object is detected, or until it is detected that a user becomes distant from the information processing device 100 (or the table 50) (step S185). In addition, the control unit 30 finishes the communication with the information processing device 100 along with the finishing of an operation of an object (step S186).

3. DESCRIPTION OF SECOND EMBODIMENT

Next, according to a second embodiment of the present disclosure, an example of the flow of the processes when the portable terminal 20 works as a master of the UI and the information processing device 100 works as a slave of the UI will be described.

(1) Pre-Process

FIG. 15 is a sequence diagram illustrating an example of the flow of the pre-process of the display control process according to the second embodiment. Referring to FIG. 15, an example of the sequence of the pre-process which involves the user, the portable terminal 20, the information processing device 100, and the display device 10 is shown.

First, the pre-process of the display control process starts when the user designates content data to be reproduced (step S202). For example, the user selects a desired item from a list of content data displayed on the display unit 32 of the portable terminal 20, thereby designating content data.

Next, the data obtaining unit 28 of the portable terminal 20 obtains the designated content data from the storage unit 26 of the portable terminal 20, the storage unit 130 of the information processing device 100, or an external network (step S204). In addition, the data obtaining unit 28 obtains UI formation data which is correlated with the content data in step S204 and defines a correspondence relationship between the user input and an operation of objects included in the content data (step S206), and if the content data designated by the user is obtained, the control unit 30 of the portable terminal 20 outputs a content image in an initial state via the display output unit 34 and displays the content image on the display device 10 (step S208).

If the UI formation data correlated with the content data, the control unit 30 searches for devices having the sensor designated by the information on a sensor to be used inside the UI formation data (step S212). For example, the communication unit 24 transmits a query packet having a predetermined format to peripheral devices of the portable terminal 20, thereby performing the device search. If the query packet is received from the portable terminal 20, the information processing device 100 responds to the device search by transmitting a response packet to the query packet (step S214).

If the response packet is received from the information processing device 100, the control unit 30 of the portable terminal 20 establishes communication with the information processing device 100 through, for example, exchange of connection information, mutual authentication, and the like (step S216).

Next, the control unit 30 transmits the operation definition information included in the UI formation data to the information processing device 100 and displays operation guidance on the display unit 114 of the information processing device 100 (step S218). When the operation guidance as exemplified in FIG. 11 is displayed, the pre-process of the display control process according to the embodiment is completed.

(2) Display Control Process

FIG. 16 is a sequence diagram illustrating an example of the flow of the display control process according to the embodiment. The display control process subsequent to the pre-process involves the user, the portable terminal 20, the information processing device 100, and the display device 10. In addition, the procedures and the number of the user inputs shown in FIG. 16 are merely for convenience of description.

For example, if the first user input is detected by the touch panel 110 of the information processing device 100 (step S230), the control unit 30 of the portable terminal 20 receives sensor data indicating a touched position from the information processing device 100 via the communication unit (step S232). In addition, the control unit 30 executes a first operation of an objected displayed in the content image (step S234), and outputs a content image according to the first operation (step S236).

In addition, for example, if the second user input is detected by the sensor of the input unit 22 (step S240), the control unit 30 executes a second operation of an object displayed in the content image (step S242). The control unit 30 outputs a content image according to the second operation (step S244).

For example, if the first user input is detected by the touch panel 110 (steps S250 and S252) and the second user input is detected by the sensor of the input unit 22 (step S254), the control unit 30 may execute an operation of an object different from the first and second operations (step S256). The control unit 30 outputs a content image according to the operation of an object, different from the first and second operations (step S258).

The operation of an object executed in the display control process may be the same as the operation according to the mapping between user inputs and operation contents as exemplified in FIG. 8.

4. CONCLUSION

The first and second embodiments of the present disclosure have been described hitherto with reference to FIGS. 1 to 16. According to the embodiments, there is a realization of the user interface which uses both the first user input detected by the touch panel 110 of the information processing device 100 and the second user input detected by the portable terminal 20. That is to say, since variations of user inputs are expanded as compared with a case of performing an operation with a single device, a user can flexibly move objects using two devices. Particularly, in recent years, various sensors have been miniaturized, and the miniaturized sensors have been mounted on a variety of portable terminals represented by smart phones. Therefore, according to the embodiments described above, it is possible to effectively improve the convenience of operations by expanding a user interface of a cradle type computer (or a computer placed on a table at least during use thereof) using sensors of portable terminals distributed in the market. In addition, a device (for example, a touch panel terminal such as the information processing device 100, or a TV set such as the display device 10) which does not have an appropriate input portion for inputting characters such as a key pad is linked to a portable terminal, and thereby it is possible to resolve inconvenience when characters are input to the device.

In addition, a user can move while handling the touch panel of the information processing system with the right hand and grasping the portable terminal with the left hand. Therefore, the user can perform an intuitive or smooth operation by appropriately distributing the UI function into the two devices.

For example, the second user input corresponds to a change in the orientation of the portable terminal, and the second operation corresponds to a change in the orientation of an object in a content image. Therefore, it is possible to operate the orientation of the object using the portable terminal which can freely change its orientation regardless of the installation surface. Such a user interface is useful for a case where, particularly, an operation target is displayed in 3D space.

In addition, for example, the first user input is a drag by a user on the touch panel of the information processing device, and the first operation is a size change, a movement, or a viewpoint change of an object in a content image. Generally, a drag on a touch panel facilitates reflecting the distance and the direction desired by a user more accurately than a case of moving a portable terminal in an actual space. Therefore, in a case where accuracy of an operation is expected to an extent, employing the above-described configuration is favorable rather than mapping both the movement and the orientation change of an object onto user inputs to a portable terminal.

In addition, according to the above-described embodiments, a content image is output to an external display device, and operation guidance regarding an operation of an object is displayed on the touch panel of the information processing device. Thereby, a user can easily operate an object in the content image while viewing the operation guidance.

In addition, a series of processes performed by the portable terminal and the information processing device, described in the present specification, may be realized using any of software, hardware, or a combination of software and hardware. A program constituting the software is stored in, for example, a storage medium installed inside or outside each device in advance. In addition, each program is loaded to, for example, a RAM (Random Access Memory) during execution, and is executed by a processor such as a CPU.

The present disclosure contains subject matter related to that disclosed in Japanese Priority Patent Application JP 2010-252748 filed in the Japan Patent Office on Nov. 11, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   circuitry that during operation:
   generates a signal for displaying a display object on a display device;
   executes a first process related to the display object in response to a first user input on a first device so as to provide a first image content for display on the display device; and
   executes a second process related to the display object in response to a second user input on a second device so as to provide a second image content for display on the display device, said second device being separate from the first device,
   the display device being separate from the first device and the second device, and
   the first user input involves a detection of a selected location of a surface of the first device and the second user input involves a change in an orientation of the second device, such that the circuitry enables (i) the first process to be executed so as to provide the first image content for display on the display device in response to the detection of the selected location of the surface of the first device and (ii) the second process to be executed so as to provide the second image content for display on the display device in response to the change in the orientation of the second device.

2. The information processing apparatus of claim 1, wherein the surface of the first device is a display surface.

3. The information processing apparatus of claim 1, wherein the surface of the first device includes a touch sensor.

4. The information processing apparatus of claim 3, wherein the first user input is a touch of the touch sensor.

5. The information processing apparatus of claim 1, wherein the information processing apparatus wirelessly communicates with the second device and the display device.

6. The information processing apparatus of claim 1, wherein the surface of the first device is a table top.

7. The information processing apparatus of claim 1, wherein, when the first user input and the second user input are detected at a same time, the circuitry executes a third process which is different from the first process and the second process.

8. The information processing apparatus of claim 1, wherein the first user input is a drag by a user on a touch panel of the first device, and the first process is a size change, a movement or a viewpoint change of the display object.

9. The information processing apparatus of claim 1, wherein the first user input is a touch by a user on a touch panel of the first device, and the first process is a selection of an operation target object from a plurality of operable objects.

10. The information processing apparatus of claim 1, wherein the first user input is a drag by a user on a touch panel of the first device, and the first process is a movement of an object in a content image, and
   wherein the circuitry controls a movement direction of the display object depending on the orientation of the display object which is changed based on the second user input.

11. The information processing apparatus of claim 1, wherein the second device detects a third user input, and
   wherein the circuitry switches the first process between a plurality of operation candidates, when information indicating detection of the third user input is received from the second device.

12. The information processing apparatus of claim 1, wherein the display device is external of the information processing apparatus.

13. The information processing apparatus according to claim 1, wherein the circuitry displays operation guidance showing an explanation regarding an operation of the display object on a touch panel of the first device.

14. A table comprising:
   a main body with the information processing apparatus according to claim 1 built therein; and
   a top panel where a display surface of a touch panel of the first device executing the detection is disposed at an upper side thereof.

15. The information processing apparatus according to claim 1, in which the circuitry enables either the first device or the second device to operate during the operation as a master device and the other of the first device and the second device to operate as a slave device such that when the first device is the master device each of the first process and the second process is executed by the first device and when the second device is the master device each of the first process and the second process is executed by the second device.

16. An information processing method comprising:
   generating a signal for displaying a display object on a display device;
   executing a first process related to the display object in response to a first user input on a first device so as to provide a first image content for display on the display device; and
   executing a second process related to the display object in response to a second user input on a second device so as to provide a second image content for display on the display device, said second device being separate from the first device,
   the display device being separate from the first device and the second device, and
   the first user input involves a detection of a selected location of a surface of the first device and the second user input involves a change in an orientation of the second device, such that the executing of the first process to provide the first image content for display on the display device is in response to the detection of the selected location of the surface of the first device and the executing of the second process to provide the second image content for display on the display device is in response to the change in the orientation of the second device.

17. A non-transitory recording medium on which is recorded a program executable by a computer to perform:

generating a signal for displaying a display object on a display device;

executing a first process related to the display object in response to a first user input on a first device so as to provide a first image content for display on the display device; and executing a second process related to the display object in response to a second user input on a second device so as to provide a second image content for display on the display device, said second device being separate from the first device, the display device being separate from the first device and the second device, and the first user input involves a detection of a selected location of a surface of the first device and the second user input involves a change in an orientation of the second device, such that the executing of the first process to provide the first image content for display on the display device is in response to the detection of the selected location of the surface of the first device and the executing of the second process to provide the second image content for display on the display device is in response to the change in the orientation of the second device.

18. An information processing system comprising:

a first device;

a second device being separate from the first device; and a circuitry that during operation;

generates a signal for displaying a display object on a display device;

executes first process related to the display object in response to a first user input on the first device so as to provide a first image content for display device;

executes second process related to the display object in response to a second user input on the second device so as to provide a second image content for display on the display device, the first user input involves a detection of a selected location of surface of the first device and the second user input involves a change in orientation of the second device, such that the circuitry enables (1) the first process to be executed so as to provide the first image content for display on the display device in response to the detection of selected location of the surface of the first device and (2) the second process to be executed so as to provide the second image content for display on the display device in response to the change in the orientation of the second device.

* * * * *